(12) United States Patent
Cheng et al.

(10) Patent No.: US 7,275,056 B2
(45) Date of Patent: Sep. 25, 2007

(54) SYSTEM AND METHOD FOR TRANSFORMING QUERIES USING WINDOW AGGREGATION

(75) Inventors: Qi Cheng, North York (CA); Linqi Liu, Toronto (CA); Wenbin Ma, Toronto (CA); Mir Hamid Pirahesh, San Jose, CA (US); Calisto P. Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 531 days.

(21) Appl. No.: 10/425,343

(22) Filed: Apr. 29, 2003

(65) Prior Publication Data

US 2004/0153448 A1   Aug. 5, 2004

(30) Foreign Application Priority Data

Jan. 31, 2003   (CA) .................................. 2418163

(51) Int. Cl.
G06F 7/00     (2006.01)
G06F 17/30    (2006.01)
(52) U.S. Cl. ............................................. 707/4; 707/5
(58) Field of Classification Search ............. 707/1–10, 707/100–104.1, 200–205
See application file for complete search history.

(56) References Cited

U.S. PATENT DOCUMENTS 5,761,657 A *  6/1998  Hoang ............................ 707/4
5,822,570 A    10/1998  Lacey ........................ 395/500
6,216,123 B1    4/2001  Robertson et al. ............. 707/3
6,223,171 B1    4/2001  Chaudhuri et al. ............ 707/2
6,345,271 B1 *  2/2002  Dempsey et al. .............. 707/4
6,370,524 B1 *  4/2002  Witkowski ..................... 707/3

OTHER PUBLICATIONS

Cesar A. Galindo-Legaria and Milind M. Joshi, Orthogonal Optimization of Subqueries and Aggregation, May 2001, ACM SIGMOD, 571-581.*
Richard A Ganski and Harry K T Wong, Optimization of Nested SQL Queries Revisited, 1987, ACM, 23-33.*

* cited by examiner

Primary Examiner—Hosain Alam
Assistant Examiner—Navneet K Ahluwalia
(74) Attorney, Agent, or Firm—Kunzler & McKenzie

(57) ABSTRACT

A system and method transform queries with subqueries, using window aggregation. An optimizer in a relational database management system transforms queries to optimize their efficiency and speed. The method transforms queries that have a subquery, replacing the subquery with a window aggregation function. In the case of a correlated subquery, the window aggregation function is partitioned by a correlated column of a correlated table. All data in the main select clause, or outer block, of the query that was obtained through references to the correlated table is instead obtained through the new window aggregation subquery. By using window aggregation, the aggregation is performed at the same time as the selection of relevant data from the correlated table, thereby compiling all needed data in a single pass through the table or view. Reducing the number of times that tables or views are accessed reduces the computational demands of a query.

45 Claims, 8 Drawing Sheets

SYSTEM AND METHOD FOR TRANSFORMING QUERIES USING WINDOW AGGREGATION

PRIORITY CLAIM

The present application claims the priority of Canadian patent application, Serial No. 2,418,163, titled "Method of Query Transformation Using Window Aggregation," filed on Jan. 31, 2003, and incorporated herein by reference.

FIELD OF THE INVENTION

The present invention relates in general to computer database systems and, in particular to query processing in a relational database management system.

BACKGROUND OF THE INVENTION

Complex queries are often encountered in larger database systems because of a desire to extract a significant amount of information in a single query. In such queries, it is common to find subqueries and aggregation functions. It is also common with such queries to find that the subquery is a correlated subquery. A correlated subquery is one in which the values from an outer query block are used to compute the inner subquery.

By way of example, a database might have two tables: an employee table and a department table. A query of this database may seek to identify the employees from a specific location and across all departments who have a salary greater than the average salary in their particular department. Such a query may take the form:

---
QUERY ONE

```
SELECT emp_id, emp_name, dept_name
FROM employee E, department D
WHERE E.dept_num = D.dept_num AND
    E.state = 'CALIFORNIA' AND
    E.salary >  (SELECT AVG (salary)
        FROM employee E1
        WHERE E1.dept_num = D. dept_num)
```
---

The main query block joins the employee and the department tables since the employee names and department names must be retrieved from columns in the respective tables. The subquery regarding the salary predicate is a correlated subquery through the equality predicate involving D.dept_num. For each employee in the outer query, the average salary for all the employees in that particular department is calculated in the subquery to determine if the employee's salary is greater than the average. Consequently, the employee table is read multiple times for both the outer query block and the subquery block.

In a partitioned (shared nothing) environment, this "tuple-at-a-time" approach to query processing results in significant network traffic and poor processing speed.

One improvement to the tuple-at-a-time approach is to employ "Magic Decorrelation". This method of query transformation changes the query into a decorrelated query that is structured to first extract a set of relevant keys based upon the outer query block predicates and to then materialize a superset of distinct values based upon the subquery predicates and the set of relevant keys. The decorrelated query then uses this materialized set of values to perform the outer block selection.

While Magic Decorrelation often achieves superior performance as compared to the tuple-at-a-time approach, the decorrelated query still accesses tables multiple times. What is therefore needed is a method for further reducing the number of times a table or view is accessed when executing a query. The need for such a system has heretofore remained unsatisfied.

SUMMARY OF THE INVENTION

The present invention satisfies this need, and presents a system, a computer program product, and an associated method (collectively referred to herein as "the system" or "the present system") for query transformation using window aggregation that reduces the number of times a table or view is accessed in the course of executing a query.

In one aspect, the present system provides a method of processing a query in a relational database management system, the query comprising an outer block and a subquery. The outer block comprises a reference to an object. The subquery has an aggregation block employing an aggregation function and an inner select clause.

The method comprises the steps of receiving the query; verifying that the query satisfies a set of preconditions; replacing the subquery with a select operation that employs window aggregation; modifying the outer block to reference the select operation; adding to the select operation a reference to the object; and removing the reference to the object from the outer block.

In another aspect, the present system provides a data processing system for performing the above method. In a further aspect, the present system provides a computer program product having a computer-readable medium tangibly embodying computer executable instructions for implementing the data processing system. In yet a further aspect, the present system provides an article comprising a computer-readable signal-bearing medium and means in the medium for implementing the data processing system.

In another aspect, the present system provides a computer program product having a computer readable medium tangibly embodying computer executable instructions for performing the above-described method.

In yet another aspect, the present system provides a data processing system for processing a query in a relational database management system, the query comprising an outer block and a subquery. The subquery has an aggregation block employing an aggregation function and an inner select clause. The outer block comprises a reference to an object.

The data processing system comprises the following components: means for receiving the query; means for verifying that the query satisfies a set of preconditions; means for replacing the subquery with a select operation that employs window aggregation; means for modifying the outer block to reference said select operation; means for adding to said select operation a reference to the object; and means for removing the reference to the object from the outer block.

In yet another aspect, the present system provides an article that comprises a computer-readable signal-bearing medium and means in the medium for directing a data processing system to implement the above-described method.

In yet another aspect of the present system, there is provided a computer program product having a computer-readable medium tangibly embodying computer executable instructions for directing a data processing system to process a query in a relational database management system. The query comprises an outer block and a subquery, the subquery has an aggregation block employing an aggregation function and an inner select clause, the outer block comprises a reference to an object.

The computer program product comprises the following: computer executable instructions for directing the data processing system to receive the query, computer executable instructions for directing the data processing system to verify that the query satisfies a set of preconditions, computer executable instructions for directing the data processing system to replace the subquery with a select operation that employs window aggregation, computer executable instructions for directing the data processing system to modify the outer block to reference the select operation, computer executable instructions for directing the data processing system to add to the select operation a reference to the object, and computer executable instructions for directing the data processing system to remove the reference to the object from the outer block.

Other aspects and features of the present system will be apparent to those of ordinary skill in the art from a review of the following detailed description when considered in conjunction with the drawings.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

DML: Data Manipulation Language, a set of statements used to store, retrieve, modify, and erase data from a database. There are two types of DML: procedural, in which the user specifies what data is needed and how to get it; and nonprocedural, in which the user specifies only what data is needed.

SQL: Structured Query Language, a standardized query language for requesting information from a database.

Xquery: XML QUERY Language. A language for querying XML documents from the W3C. Compatible with related W3C standards (XML Schema, XSLT, etc.), XQuery was derived from the XPath language and uses the same syntax for path expressions. Based on the XQuery data model, XQuery processes the query by parsing the XML document, the schema and the query into hierarchical node trees. It also generates an output schema with the query results. XQuery is expected to become as popular for querying XML documents as SQL is for relational databases.

XML: eXtensible Markup Language. A standard format used to describe semi-structured documents and data. During a document authoring stage, XML "tags" are embedded within the informational content of the document. When the XML document is subsequently transmitted between computer systems, the tags are used to parse and interpret the document by the receiving system.

Although embodiments of the present invention described below use the Semantic Query Language (SQL) standard and may be described in connection with their implementation in the DB2™ relational database management system computer program produced by International Business Machines Corporation, Armonk, N.Y., the present invention is not limited to such embodiments and may be implemented in conjunction with any relational database management system and any data manipulation language. Any limitations presented that result from the use of a particular computer language or a particular computer system, operating system, or database management system, are not intended as limitations of the present invention.

In the description that follows, reference may be made to tables. It is to be understood that the present invention is not limited to queries involving tables, but also applies to other queries, comprising those involving views. In the description that follows, the term "object" may be employed to refer to the class of database elements that comprises tables and views.

Figure 1:
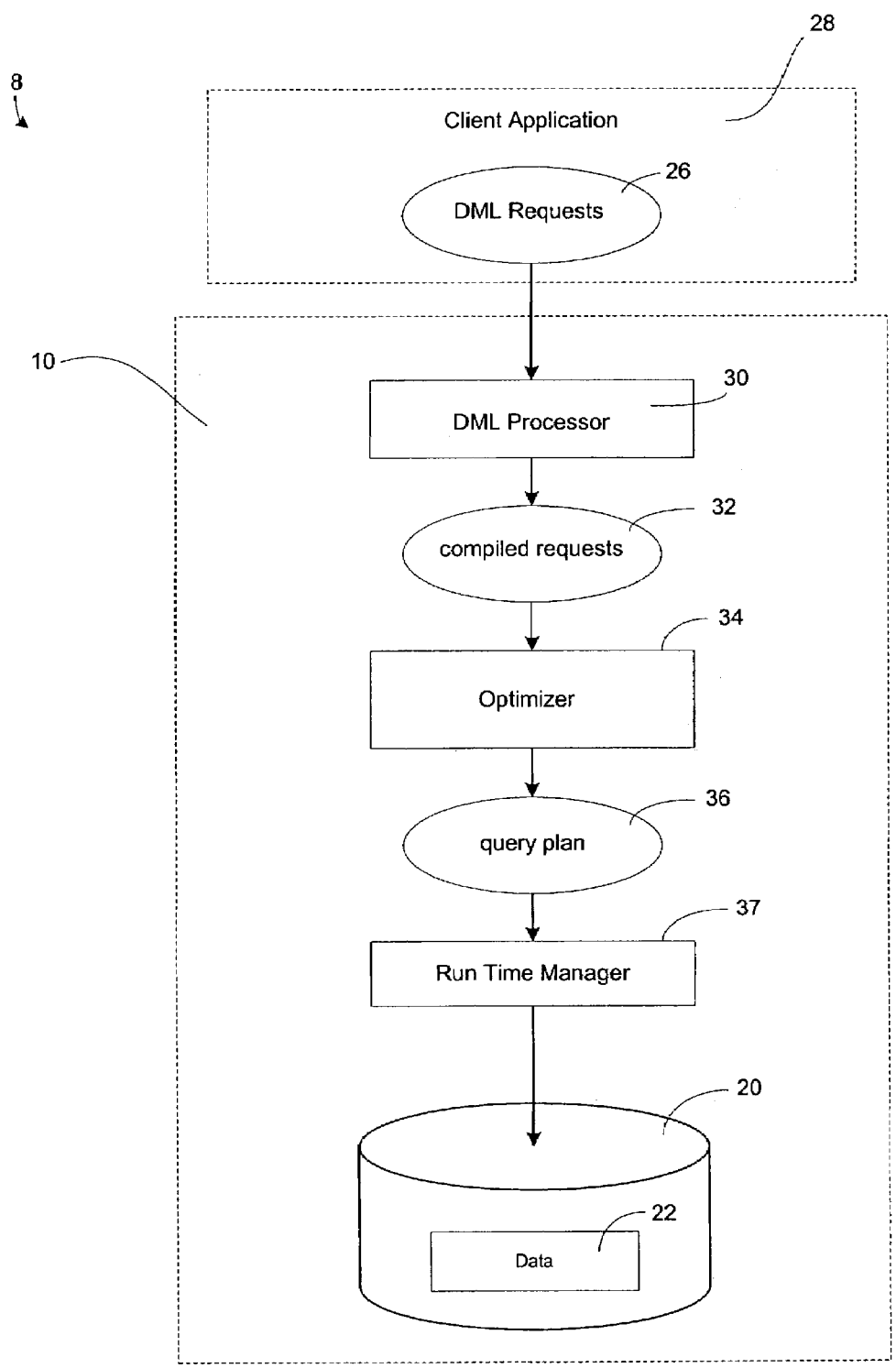
FIG. 1 is a schematic illustration of an exemplary relational database management system in which an query transformation system of the present invention can be used.

FIG. 1 portrays an exemplary overall environment in which a query transformation system according to the present invention may be used. The query transformation system comprises a software programming code or computer program product that is typically embedded within, or installed on a server 10. Alternatively, the query transformation system can be saved on a suitable storage medium such as a diskette, a CD, a hard drive, or like devices.

FIG. 1 shows in block diagram form a Relational Database Management System (RDBMS) 8 implemented upon a server 10. The RDBMS 8 comprises a database 20 that contains data 22.

The RDBMS 8 receives DML requests 26 from a client application 28. The DML requests 26 could be to update, retrieve, delete or manipulate the existing data 22 or add new data to the database 20. In particular, the DML request 26 may be a query, which is a request to retrieve a certain set of data based upon specified constraints or predicates. The DML request 26 is written in a data manipulation language (DML), such as SQL, XQuery, or others.

The DML processor 30 produces a compiled request 32 that is passed to an optimizer 34. The optimizer 34 determines an efficient manner of implementing the DML request 26 and produces an optimized request 36, also referenced as a query plan 36. The run time manager 37 then executes the query plan 36 and, if appropriate, the results are returned to the client application 28. The architecture and operation of RDBMS systems and possible variations will be well understood by those of ordinary skill in the art.

The optimizer 34 performs a number of functions to create the query plan 36, including the steps of performing query transformation, generating candidate query plans 36, and of estimating costs. The act of query transformation involves rewriting a received query in an attempt to structure the query in a more efficient manner, but in a manner that will still retrieve the same set of data as would result from running the original query. In one aspect, the goal of query transformation is to reduce the computational demands of a particular query by minimizing the number of times a query plan 36 must access tables in the database 20.

Those of ordinary skill in the art will be familiar with common data manipulation languages, such as SQL, and will recognize that these languages typically provide a number of aggregation functions for use in manipulating the data 22. For example, SQL provides the functions SUM( ), COUNT ( ), AVG( ), MIN( ), and MAX( ), among others. Many database queries will utilize an aggregation function within a subquery, meaning that the subquery must perform an aggregation operation upon a selection of data before applying a predicate in the outer query block.

In many cases, the subquery will be a correlated subquery through a correlation predicate in the subquery. An example of such a query is Query One, shown above, in which the correlated subquery comprises the aggregation function AVG( ) and a SELECT operation. The correlation comes through the predicate E1.dept_num=D.dept_num where the column D.dept_num is a reference to the outer query block.

Those of ordinary skill in the art will also be familiar with window aggregation functions, such as the window aggregation function adopted as a part of the SQL standard. A window aggregation function is an aggregation function that works over a specified group of rows and reports the result on the current row being evaluated. Such a function is a hybrid between an aggregation function and a scalar function insofar as it does not collapse the rows involved in computing the aggregation. Under the SQL standard, the adopted format for a window aggregation function is:
Function(arg) OVER(partition-clause order-clause window-agg-group)

The OVER clause specifies the three primary attributes of the function. These three attributes are optional. The order-clause is similar to an ORDER BY clause of a statement, except that the order is only referenced in the context of the function. The partition-clause is similar to the commonly used GROUP BY clause, but again only applies in the context of the function. The window-agg-group allows the expression to specify a window of rows to which the aggregation is applied.

An embodiment of the present invention employs window aggregation to assist in transforming queries that have subqueries. Using window aggregation, the outer query block may be matched with the subquery block and common processing may be eliminated. In the case of a correlated subquery, the traditional aggregation in the subquery is transformed into window aggregation using the partition-by clause to replace the correlation predicate. Consequently, only a single pass of the relevant data in the outer query block is necessary since the aggregation is performed at the same time as the rows are read. This may be referred to as "in-line" or "on the fly" aggregation.

By way of example, consider the following query from the TPCH benchmark:

| QUERY TWO |
| --- |
| SELECT SUM(l_extendedprice) / 7.0 AS avg_yearly<br>FROM    tpcd.lineitem,<br>           tpcd.part<br>WHERE      p_partkey = l_partkey<br>         and p_brand = 'Brand#23'<br>         and p_container = 'MED BOX'<br>         and l_quantity <   (select 0.2 * avg(l_quantity)<br>                               from tpcd.lineitem<br>                               where l_partkey = p_partkey); |

Figure 2:
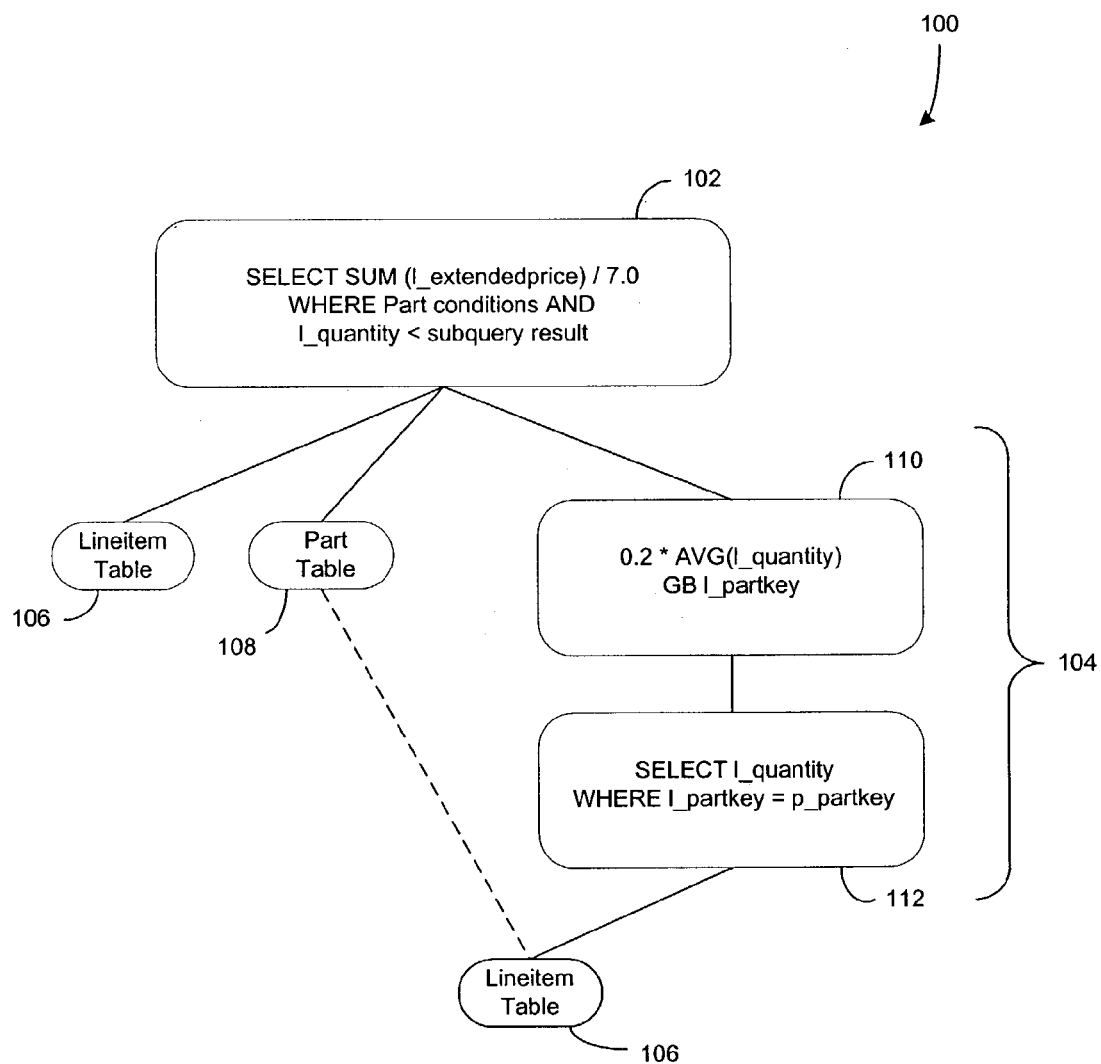
FIG. 2 is a diagram illustrating the structure of a TPCH benchmark query.

FIG. 2 shows the structure of Query Two in diagrammatic form. Query Two 100 comprises an outer block 102 also referred to as the upper select 102, and a subquery 104 also referred to as the lower select 104. The outer block 102 is a selection of data from a table, Lineitem 106 (also referenced as Lineitem table 106), and another table, Part 108 (also referenced as Part table 108).

The selection is a yearly average (over seven years) calculated as the sum of extended price values from Lineitem table 106 divided by seven. The predicates in the outer query block comprise a join of Part table 108 and Lineitem table 106 to match partkey values and limits the relevant rows to those where the brand and container values in Part table 108 are "Brand#23" and "MED BOX", respectively. The outer block 102 also contains a predicate that the quantity value in Lineitem table 106 is less than 20% of the average quantity for that partkey. This is the subquery 104.

The subquery 104 comprises an aggregation function 110 and a selection function 112. The aggregation function 110 is the computation of 20% of the average quantity for each partkey. The selection function 112 provides the aggregation function 110 with the quantities for each partkey from the equivalence of the partkey values from Lineitem table 106 and the Part table 108. The selection function 112 selects data from Lineitem table 106, but is correlated to Part table 108 through the predicate l_partkey=p_partkey.

If this query were executed in its present form, it would be computationally intensive since the subquery would calculate an average quantity from Lineitem table 106 for each partkey value satisfying the predicates of the outer block 102. In other words, for each row of Part table 108 that meets the outer block 102 predicates, the subquery accesses Lineitem table 106 to aggregate and average the quantities for that partkey value.

The outer block 102 then accesses Lineitem table 106 again to aggregate the extendedprice values and calculate the yearly average. With a large database 20, accessing a table multiple times can drastically reduce efficiency. This query could conceivably require that Lineitem table 106 be accessed hundreds of times.

The performance of Query Two 100 may be improved by transforming it using Magic Decorrelation. This transformation involves modifying the query to extract relevant keys to generate a superset of realized values. The subquery predicate may then be computed using the superset to materialize a set of values that are then used to run the outer query block.

Transformation of Query Two 100 using Magic Decorrelation results in the following query:

---

QUERY THREE

---

WITH Supp_Part AS
    (SELECT p_partkey
    FROM lineitem, part
    WHERE p_partkey = l_partkey AND
        p_brand = 'Brand#23' AND
        p_container = 'MED BOX'),
Magic AS  (SELECT DISTINCT p_partkey
    FROM Supp_Part),
Decorr_Subquery (l_partkey, avg) AS
    (SELECT l_partkey, 0.2 * AVG(l_quantity)
    FROM lineitem, Magic m
    WHERE l_partkey = m.p_partkey
    GROUP BY l_partkey),
Complete_Decorr_Subquery (l_partkey, avg) AS
    (SELECT l_partkey, coalesce (avg, 0)
    FROM Magic m LEFT JOIN Decorr_Subquery d
       ON m.p_partkey = l_partkey),
SELECT SUM(l_extendedprice)/7.0 AS avg_yearly
FROM lineitem l, part p, Complete_Decorr_Subquery d
WHERE l.l_partkey = p.p_partkey AND
    p_brand = 'Brand#23' AND
    p_container = 'MED BOX' AND
    p.partkey - d.l_partkey AND
    l.l_quantity < d.avg;

---

In Query Three, the Supp_Part view applies the uncorrelated outer query block predicates to create a superset of partkey values from Part table 108. The Magic view represents the duplicate-free set of correlation values from the Supp_Part view that feeds the subquery. The Decorr_Subquery view is the table generated by decorrelating the subquery using the Magic view. The Complete_Decorr_Subquery view is a step required to address the COUNT bug, as will be understood by those of ordinary skill in the art. The final SELECT block provides the query result, wherein the predicate p.partkey=d.l_partkey enforces the correlation relationship.

This transformation improves upon the tuple-at-a-time approach; however, Lineitem table 106 is still referenced three times in Query Three: once to generate the Supp_Part view, again to generate the Decorr_Subquery view, and a third time to perform the final SELECT operation. An embodiment of the present invention provides a method of query transformation that decorrelates the subquery in a more efficient manner using window aggregation.

In accordance with an embodiment of the present invention, Query Two 100 may be rewritten as:

---

QUERY FOUR

---

WITH WinMagic AS
  (SELECT l_extendedprice, l_quantity,
      avg(l_quantity)over(partition by p_partkey)
      AS avg_l_quantity
  FROM tpcd.lineitem, tpcd.part
  WHERE p_partkey = l_partkey and
    p_brand = 'Brand#23'
    p_container = 'MED BOX')
SELECT SUM(l_extendedprice) / 7.0 as avg_yearly
FROM WinMagic
WHERE l_quantity < 0.2 * avg_l_quantity;

---

Figure 3:
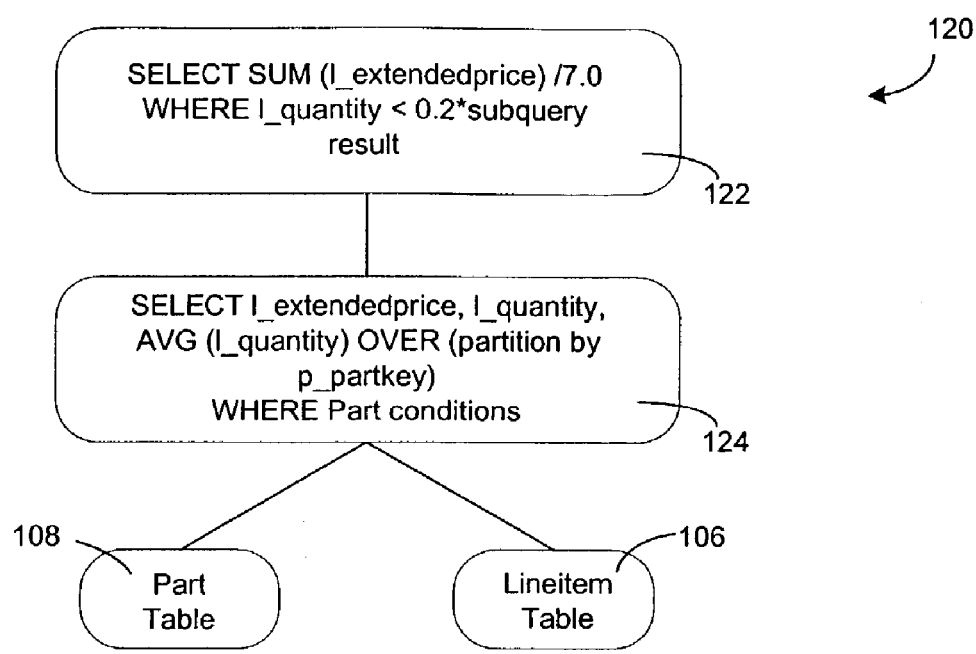
FIG. 3 is a diagram illustrating the TPCH benchmark query of FIG. 2 transformed in accordance with the query transformation system of FIG. 1.

FIG. 3 shows the structure of Query Four 120 in diagrammatic form. Query Four 120 comprises an outer block 122 and a subquery 124; however, all of the references to Lineitem table 106 and Part table 108 are now funneled through the subquery 124. The correlation in FIG. 2 of the selection function 112 to Part table 108 through the predicate l_partkey=p_partkey has been eliminated.

The subquery 124 creates the WinMagic view using a select command that accesses Lineitem table 106 to obtain l_extendedprice and l_quantity. As subquery 124 performs that selection, it also performs an aggregation of l_quantity partitioned over p_partkey values and the averaging of those values. The subquery 124 also comprises a join of Part table 108 and Lineitem table 106, through the predicate p_partkey=l_partkey, and it applies the uncorrelated Part table 108 predicates regarding the brand and the container columns.

The outer block 122 performs the selection operation to obtain the yearly average from the sum of extended prices divided by seven from the WinMagic view, and applies the predicate that l_quantity is less than 20% of avg_l_quantity.

The aggregation of average quantities for each p_partkey is performed at the same time as the relevant values from Lineitem table 106 are selected. In essence, the aggregation operation is performed in-line with the selection operation as rows are read in from Lineitem table 106. Consequently, Part table 108 and Lineitem table 106 are only accessed once in a single pass to create the WinMagic view, and only the WinMagic view is used in performing the outer block 122. This eliminates repeated access to Lineitem table 106 and Part table 108, improving query performance speed.

Figure 5:
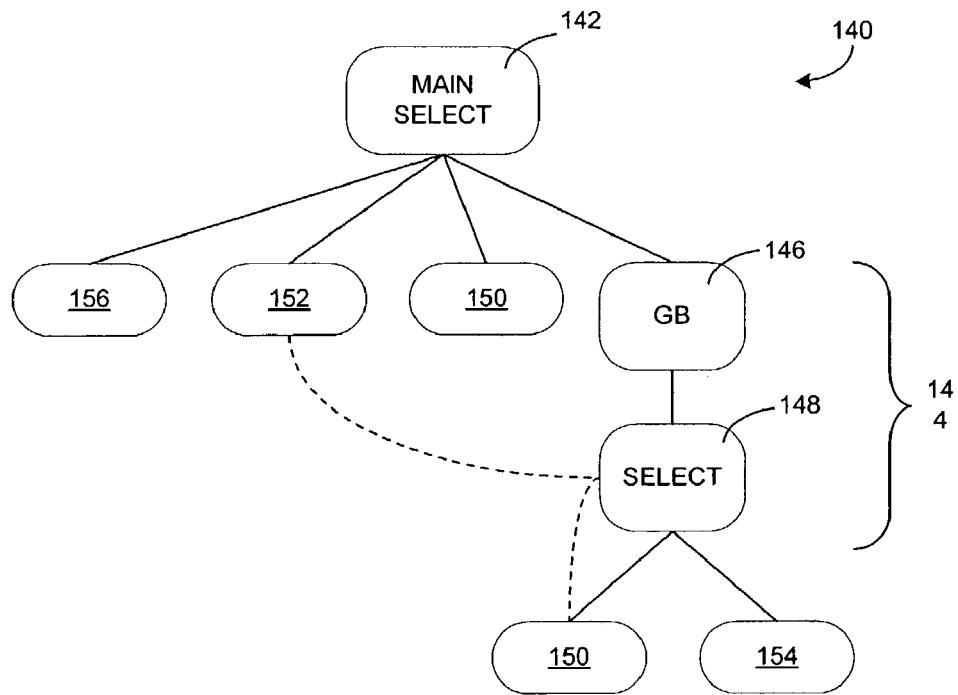
FIG. 5 is a diagram showing the structure of a basic correlated query.

FIG. 5 shows the structure of a basic correlated query 140 in diagrammatic form. The basic correlated query 140 comprises an outer main select clause, main select 142, and a subquery 144. The subquery 144 comprises an aggregation function GB 146 and an inner select clause, select 148, also referenced as inner select 148.

The main select 142 involves multiple objects, the objects being base tables or views, comprising a first table 152 and a second table 150. The second table 150 is also referenced by the inner select 148. The second table 150, through its reference in the inner select 148, is correlated to the first table 152, as indicated by the dotted line. As may be seen from the diagram, the second table 150 will need to be accessed at least twice to execute the query. Because of the correlation, the second table 150 may need to be accessed many times to execute the query if performed using the tuple-at-a-time approach.

The main select 142 may involve other objects, i.e. tables or views, as shown by a main select table 156. Similarly, the inner select 148 may involve other objects, i.e. tables or views, as shown by a subquery table 154.

Figure 10:
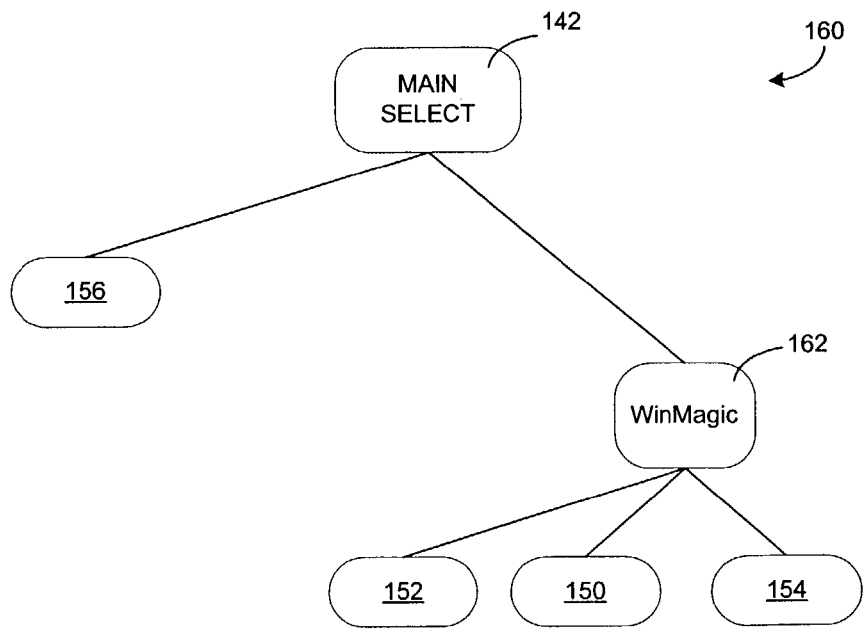
FIG. 10 is a diagram showing, the structure of basic correlated query from FIG. 5 transformed into a decorrelated query, in accordance with the query transformation system of FIG. 1.

Through a query transformation in accordance with an embodiment of the present invention, the basic correlated query 140 shown in FIG. 5 may be transformed into a decorrelated query 160, the structure of which is shown in diagrammatic form in FIG. 10.

The decorrelated query 160 comprises the main select 142 in substantially similar form to that found in the basic correlated query 140. The decorrelated query 160 also comprises a subquery having a WinMagic clause (WinMagic 162) that results from the transformation of the original correlated subquery 144 (FIG. 5). WinMagic 162, alternately referenced as WinMagic clause 162, uses a window aggregation function to implement the selection and aggregation formerly performed by the subquery 144.

In addition, the WinMagic clause 162 incorporates all references to the first table 152, the second table 150, and any subquery tables such as subquery table 154. The main select 142 receives the results of the WinMagic clause 162 and references any main select tables 156. In essence, all tables or views other than the uncorrelated main select tables 156 have been pushed down to be dealt with in the subquery WinMagic clause 162.

Referring again to FIG. 5, there are certain preconditions that the basic correlated query 140 must satisfy before a query transformation according to an embodiment of the present invention will be performed. In any particular embodiment, there may also be some simplification conditions that the basic correlated query 140 should satisfy before the query transformation is performed. These simplification conditions may not be necessary for successful operation of the transformation, but may allow the transformation to be implemented without accounting for all possible cases, and may therefore simplify the implementation.

Figure 4:
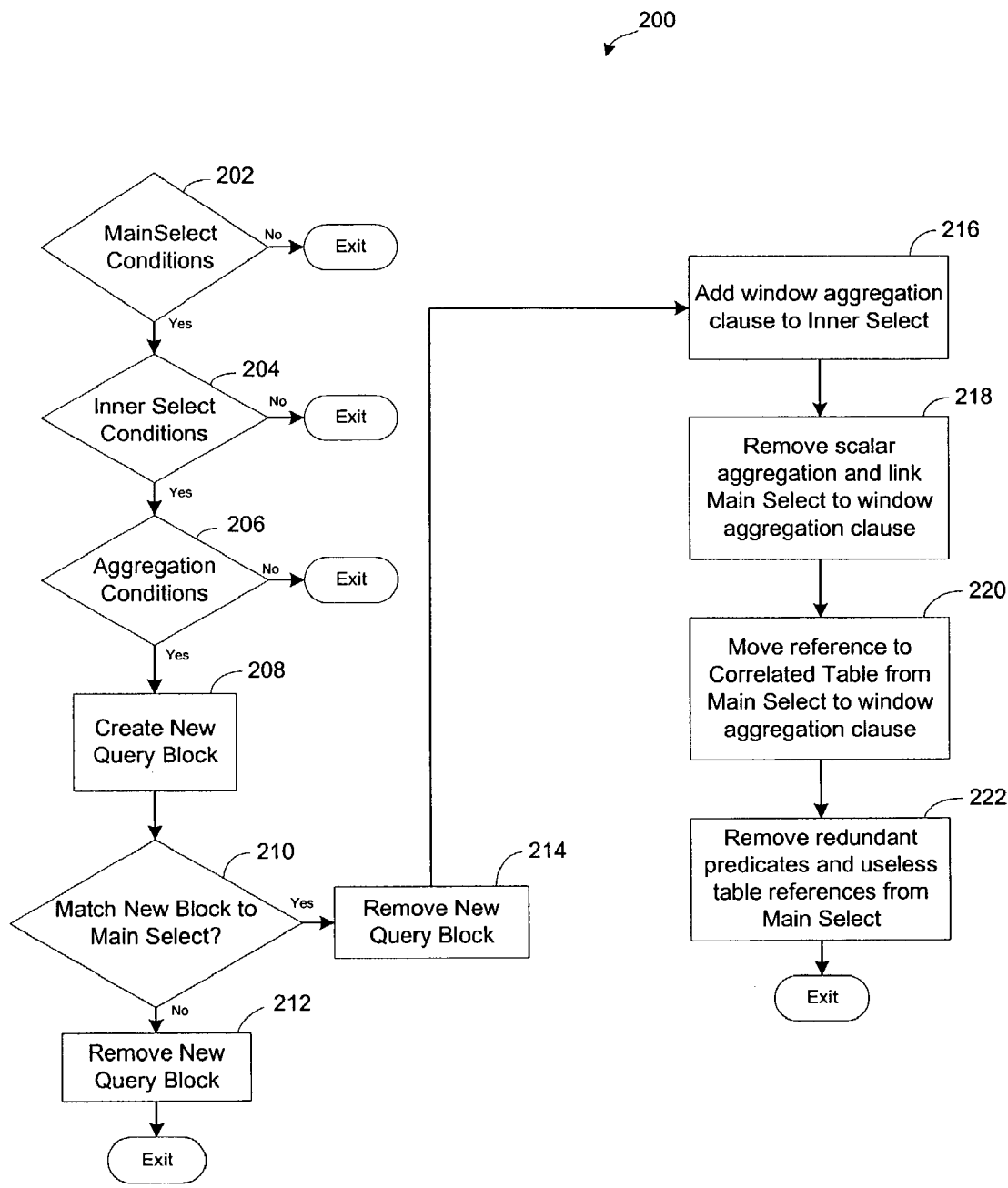
FIG. 4 shows is a process flow chart illustrating a method of query transformation of the query transformation system of FIG. 1.

The process flowchart of FIG. 4 illustrates a method 200 of query transformation according to an embodiment of the present invention. Further reference is made to diagrams in FIGS. 5 through 10, which show the effect of the steps of the method 200 upon the structure of the basic correlated query 140.

The optimizer 34 (FIG. 1) performs the method 200 once the basic correlated query 140 has been received from the DML processor 30 (FIG. 1). The first three steps 202, 204, 206 of the method 200 evaluate whether the basic correlated query 140 meets the preconditions for use of the transformation. Step 202 evaluates conditions required by the main select 142, step 204 evaluates conditions required by the inner select 148, and step 206 evaluates conditions required by the aggregation function GB 146.

In particular, the method 200 determines in step 202 whether the main select 142 has at least one aggregation subquery predicate, i.e. whether it comprises the subquery 144. This is a necessary condition for performance of the query transformation.

In this embodiment, there are two other preconditions that the main select 142 must meet. The main select 142 must be an uncorrelated query block, meaning that it is not itself correlated to something higher up in the query structure. This condition is imposed to simplify the implementation of the method 200, since cases involving a correlated main select 142 would involve complications. Nevertheless, there are embodiments in which this precondition could be removed.

In addition, the main select 142 must meet the precondition that it does not contain functions that have side effects or that are non-deterministic. A function has side effects if it has an external impact, such as a "Send E-mail" function, or contains a function that writes temporary data to a scratch pad. A non-deterministic function is one whose outcome depends upon its input and the number of times it has been called.

For example, a RND ( ) function for generating a random number is non-deterministic since it will not yield a predictable (deterministic) outcome. Both types of functions may produce different effects if the query is modified such that they are called in a different order. Although it may be possible to deal with such functions by evaluating whether the transformation will impact their operation, for simplification in this embodiment the method 200 imposes the condition that no such function appear in the main select 142.

In step 204, the method 200 analyzes the inner select 148 to test for the satisfaction of certain preconditions. It is necessary that the inner select 148 should not have a DISTINCT (duplicate removal directive) in the select clause. Next, the method 200 requires that the correlated predicate between the first table 152 and the second table 150 is an equality predicate and is of the relation N:1, with the first table 152 being unique. The inner select 148 can not contain a correlation predicate between the first table 152 and any subquery tables such as subquery table 154. In addition, the inner select 148 can not be a "Common" sub-expression, meaning that the subquery can not be used in the query other than as a predicate in the main select 142.

In the present embodiment, the method 200 imposes additional conditions for the purpose of simplification. For example, the method 200 requires that the inner select 148 have no functions that have side effects and no functions that are non-deterministic, as method 200 required for the main select 142 clause. For similar reasons, the inner select 148 can only involve base tables or views, avoiding the possibility of functions that call SQL internally or have other effects that are difficult to accommodate in the transformation.

Additionally, the method 200 comprises a condition that the inner select 148 is not correlated to any query block other than the main select 142 clause. It is possible that the inner select 148 could be correlated to some block higher in the query. If so, then the method 200 will not perform the transformation. In other embodiments, this case may be accommodated, especially if both the main select 142 and the inner select 142 are correlated to the higher block on the same basis.

Other embodiments may impose other conditions, such as a condition that the main select 142 involving the first table 152 should subsume the portion of the subquery 144 involving the first table 152. If this latter condition is not met and the portion of the subquery 144 has extra predicates, then it may be necessary to compensate using a CASE expression within the window aggregation function. In that case, a COALESCE expression may be necessary to handle the COUNT bug in SQL.

Step 206 tests preconditions for the aggregation function GB 146. The aggregation function GB 146 can have no grouping items. In addition, the aggregation must be a simple aggregation without any DISTINCT or duplicate removal directive. A 'simple' aggregation is one in which the argument expression is composed of constants or columns from the view generated by the inner select 148. In the SQL language, simple aggregations comprise MAX ( ), MIN ( ), AVG ( ), SUM ( ), and COUNT ( ). Other simple aggregation functions will be apparent to those of ordinary skill in the art.

If the basic correlated query 140 fails to satisfy any one of the above conditions, then the method 200 exits without performing the transformation. Provided that the basic correlated query 140 satisfies the conditions tested in steps 202, 204, and 206, the method 200 proceeds to step 208 and begins a transformability test to determine whether the transformation can successfully be performed.

Figure 6:
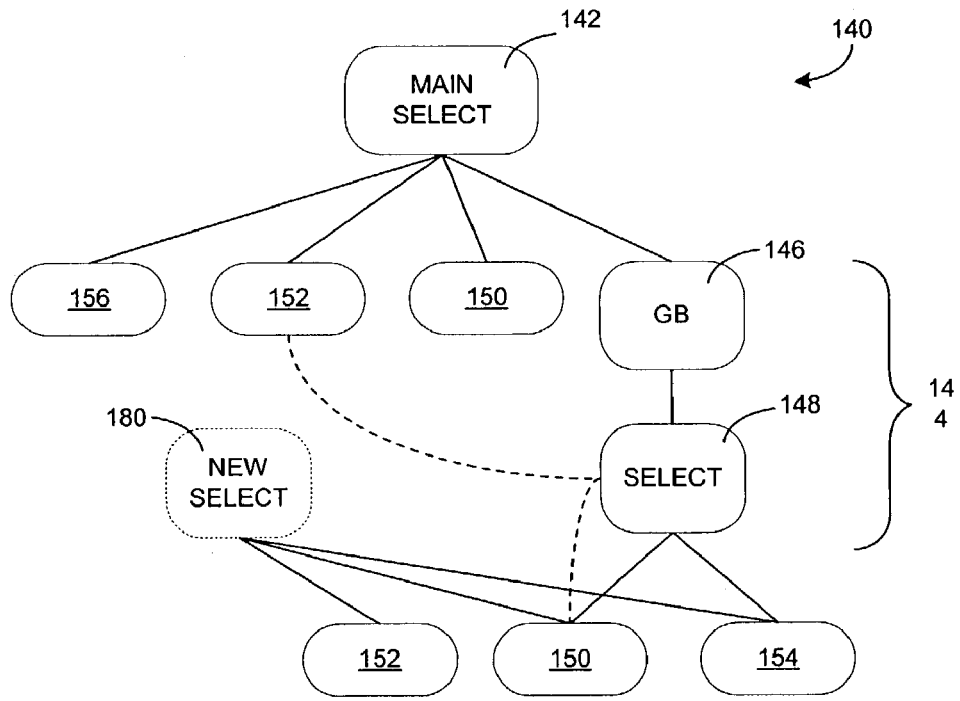
FIG. 6 is a diagram showing the structure of the basic correlated query in the course of a transformability test.

As shown in the query diagram of FIG. 6, a new subquery block, new select 180 (also referenced as subquery block 180) is constructed at step 208 similar to the inner select 148, but with a join between the first table 152 and the second table 150. This join in the new subquery block 180 replaces the correlated equality predicate in the inner select 148. This simulates a materialized view that most database engines (i.e., DB2™) can use to match portions of a query.

The new subquery block 180 is then evaluated in step 210 to determine whether it can match the corresponding tables and predicates in the main select 142. In essence, the correlated equality predicates in the subquery must be matched in the main select 142. For example, the main select 142 may contain an equality predicate tying together columns of two tables. If the subquery contains the same predicate plus another predicate involving those two tables but across different columns, then the method 200 recognizes that the query transformation cannot be performed.

If the new subquery block 180 does not pass the evaluation of step 210, it is removed (step 212) and the method 200 exits without performing the transformation. If the new subquery block 180 does pass the evaluation then it is removed (step 214) and the method 200 continues with the transformation at step 216.

Figure 7:
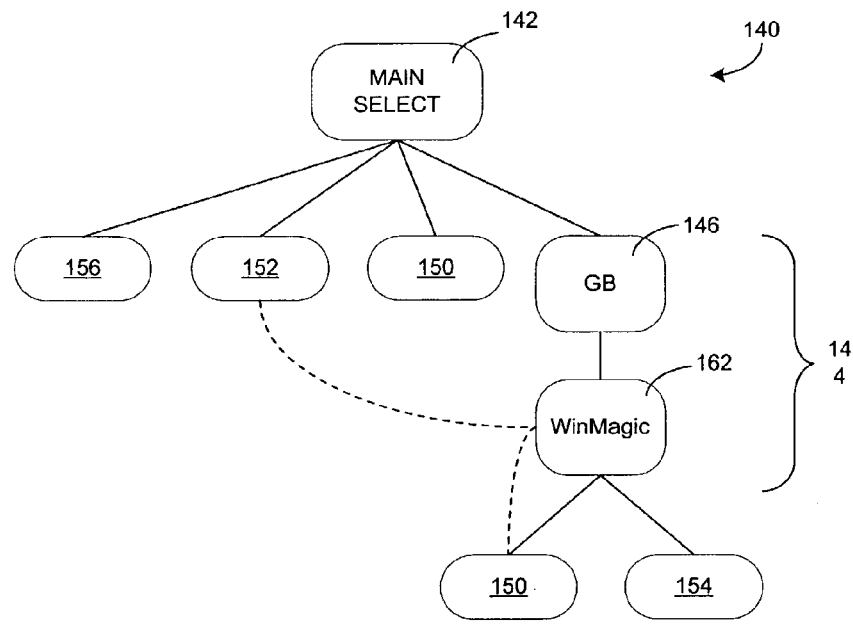
FIG. 7 is a diagram showing the structure of the basic correlated query after a first step in the transformation.

The first step of the transformation, step 216, changes the inner select 148 to a WinMagic clause 162 by adding a window aggregation function that uses the correlation predicate column of the second table 150 to partition the scalar aggregate function. For example, if the correlation predicate is T1.Cx=T2.Cy and if the aggregation function is AVG (T3.Cz) then the window aggregation function is AVG (T3.Cz) OVER (partition by T3.Cy). The effect of step 216 is illustrated by FIG. 7, which shows the structure of the basic correlated query 140 following step 216.

Figure 8:
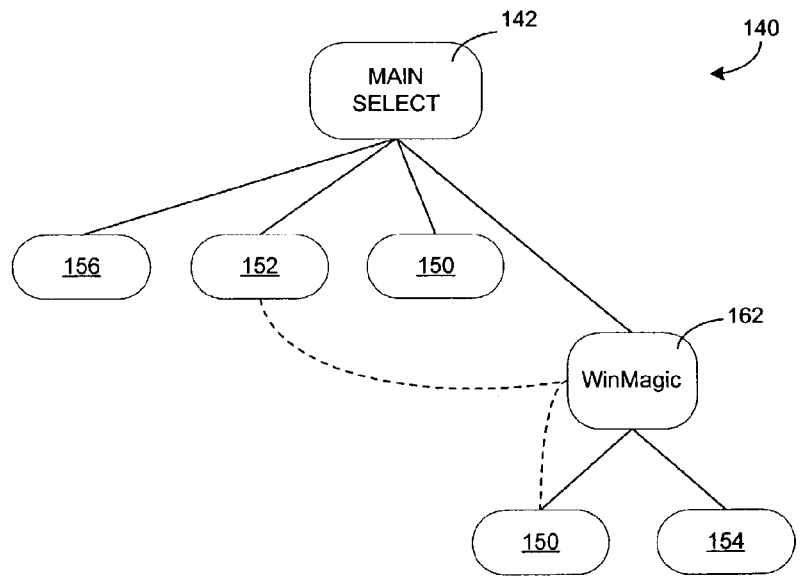
FIG. 8 is a diagram showing the structure of the basic correlated query after a second step in the transformation.

Once the WinMagic clause 162 is created, the aggregation function GB 146 may be removed and the subquery predicate in the main select 142 may be modified to refer to the WinMagic clause 162 (step 218). The effect of step 218 upon the structure of the basic correlated query 140 is shown in FIG. 8.

Figure 9:
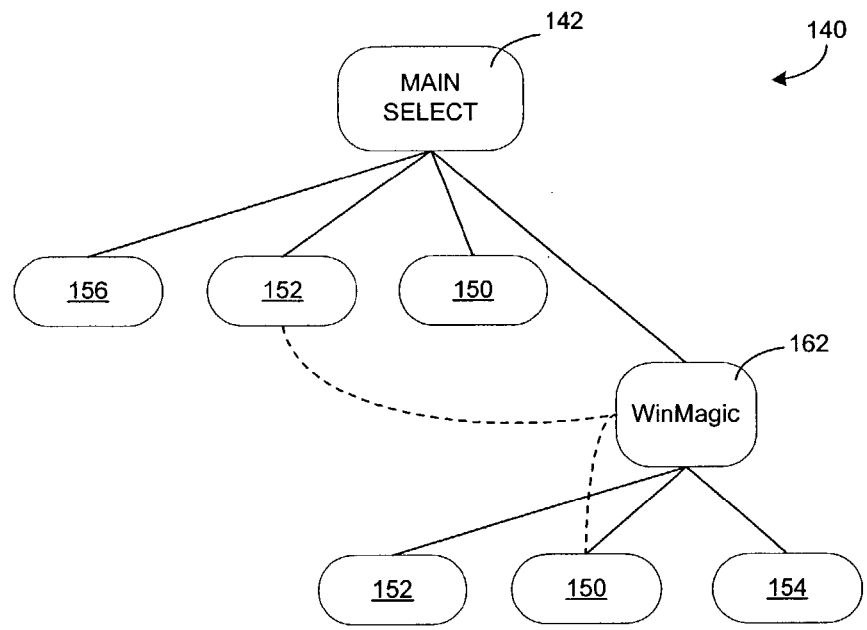
FIG. 9 is a diagram showing the structure of the basic correlated query after a third step in the transformation.

In step 220, the first table 152 is added to the WinMagic clause 162 to redirect all flow of data required from the first table 152 by the main select 142 clause through the subquery WinMagic clause 162. In other words, any first table 152 data previously obtained through predicates in the main select 142 clause can be obtained instead through the WinMagic clause 162. Because the basic correlated query 140 passed the transformability test in step 210, it is understood that this data can be funneled through the subquery. FIG. 9 illustrates the effect of step 220 upon the structure of the basic correlated query 140.

In step 222, all predicates in the main select 142 that have been exactly matched in the WinMagic clause 162 are removed from the main select 142. Accordingly, useless connections to the first table 152 and second table 150 are also removed. The final structure of the decorrelated query 160 is shown in FIG. 10. Note that all data, other than data from the uncorrelated main select tables 156 or views, is now obtained through the WinMagic clause 162. Consequently, the first table 152 and second table 150 need only be accessed once.

As a further example, consider the following query from a temporal database 20 in which records comprise a date column and a sequence column to monitor which records are the most recent:

QUERY FIVE

SELECT * FROM empl E1
WHERE eff_date = (SELECT MAX(eff_date)
        FROM empl E2
        WHERE E1.emplid = E2.emplid) AND
    seq = (SELECT MAX(seq)
    FROM empl E3
    WHERE E1.emplid = E3.emplid) AND
        E1.eff_date = E3.eff_date)

Figure 11:
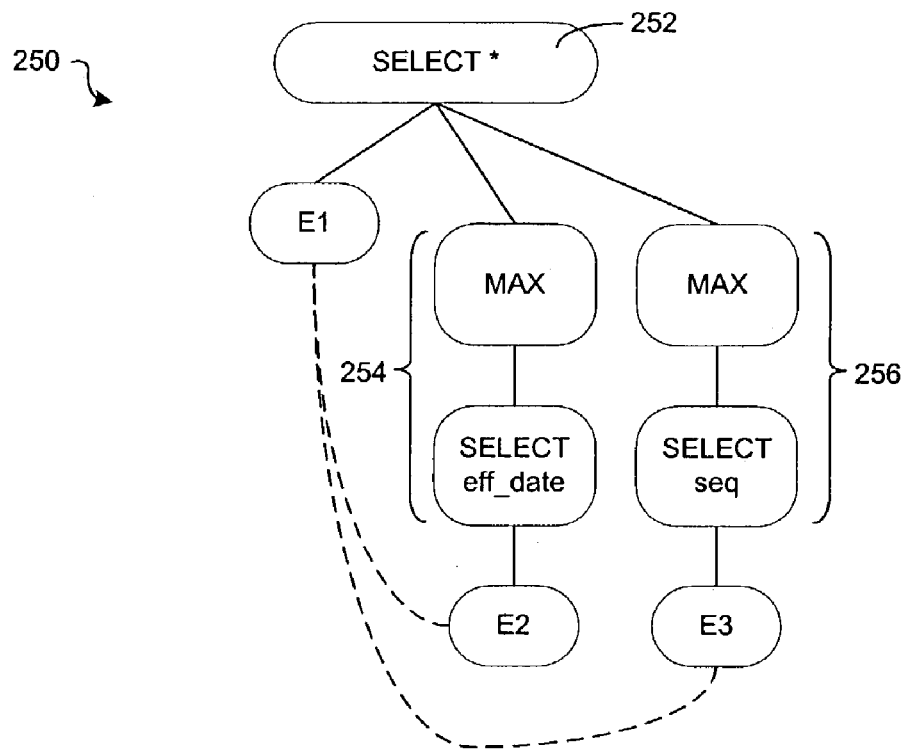
FIG. 11 is a diagram illustrating the structure of a query of a temporal database.

FIG. 11 illustrates the structure of Query Five 250 in diagrammatic form. Query Five 250 comprises a main select clause, select* 252. Select* 252 retrieves a record for each employee (by employee id) from the employee table based upon the record having the maximum effective date and the maximum sequence value, i.e. based upon it being the most recently updated record for that employee. Accordingly, Query Five 250 comprises two subqueries: subquery 254 to calculate the maximum effective date for each employee and subquery 256 to calculate the maximum sequence value for that employee on that date. Both of these subqueries 254, 256 are correlated to the main select clause, select* 252.

In accordance with method 200, Query Five 250 may be rewritten as follows:

QUERY SIX

Figure 12:
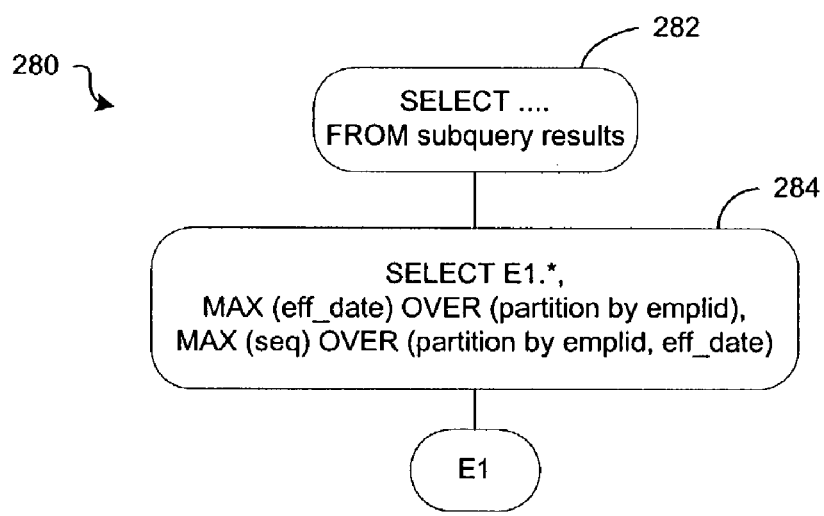
FIG. 12 is a diagram illustrating the structure of the query of the temporal database of FIG. 11 following query transformation in accordance with the query transformation system of FIG. 1.

SELECT . . . FROM
(SELECT E1.*,
    MAX(eff_date) OVER (partition by emplid) as ME
    MAX(seq) OVER (partition by emplid,eff_date) as MS
    FROM empl E1) as E
    WHERE eff_date = ME AND seq = MS;

FIG. 12 shows in diagrammatic form the structure of Query Six 280. As can be seen from the structure of Query Six 280, the transformation results in a main select clause 282 that receives data directly and only from a subselect clause 284. In the subselect clause 284, in-line window aggregations are performed to materialize the desired set of data organized by maximum effective date and maximum sequence value. The subselect clause 284 only requires input from a single instance of the employee table that is obtained in a single pass, whereas the original query involved three instances of the table and would have required multiple readings.

The present invention is not limited to correlated subqueries. Non-correlated subqueries may also benefit from a similar transformation. For example, a query may be constructed to find all employees with a salary greater than the average across all departments. Such a query may take the form:

QUERY SEVEN

SELECT emp_id, emp_name
FROM employee E
WHERE E.state = 'CALIFORNIA' AND
    E.salary > (SELECT AVG(salary)
        FROM employee E1
        WHERE E1.state = 'CALIFORNIA');

In the above query, the average salary for the whole employee table is computed and used in the predicate when the employee table is accessed again to return the relevant rows. This query could be transformed in accordance with an embodiment of the present invention so as to access the employee table only once:

QUERY EIGHT

SELECT emp_id, emp_name
FROM (SELECT emp_id, emp_name, AVG(salary) OVER ( ) AS
    AVGSAL FROM employee E
    WHERE E.state = 'CALIFORNIA') AS E1
    WHERE E.salary > AVGSAL The OVER clause in Query Eight contains no partition information because the average is calculated over the whole set.

In the above example, the predicates in the outer query block match the predicates in the inner query block. Consequently, no rows will be missed from the output and the aggregation is performed over the required set of values. In other situations, the predicates need not match exactly. For example, the Query Seven, above, could be written to find the California employees having a salary greater than the salary of the California employees over the age of 30. This query may take the form:

---
QUERY NINE
---
SELECT emp_id, emp_name
FROM employee E
WHERE E.state = 'CALIFORNIA' AND
    E.salary > (SELECT AVG(salary)
        FROM employee E1
        WHERE E1.state = 'CALIFORNIA' AND
        E1.AGE > 30);
---

Query Nine may be transformed by suitably adjusting the computation of the average salary through the use of a CASE expression, resulting in the following transformed query:

---
QUERY TEN
---
SELECT emp_id, emp_name
FROM (SELECT emp_id, emp_name, AVG(CASE WHEN age > 30
    THEN salary ELSE NULL END) OVER ( ) AS AVGSAL
    FROM employee E
    WHERE E.state = 'CALIFORNIA') AS E1
WHERE E.salary > AVGSAL
---

In the above Query Ten, more rows than necessary are fed into the aggregation function to avoid including the extra predicates from the subquery of Query Nine. When processing more rows than necessary, the CASE expression is required within the window aggregate function to compute the appropriate value. In such a situation, it may be necessary to estimate the cost of the transformed query to determine whether the transformation is beneficial.

It will be appreciated that the embodiments of the present invention may be implemented by a computer program product having a computer-readable medium tangibly embodying computer executable instructions for directing a data processing system to implement the embodiments of the invention. In addition, the computer program product may be used to configure a processing system that embodies the invention. It will be appreciated that the computer program product may be a floppy disk, hard disk or other medium for long term storage of the computer executable instructions.

It will also be appreciated that the embodiments of the present invention may be realized by conveying an article over a network from a supplier to an end user, in which the article has a computer-readable signal-bearing medium and also has means in the medium for directing a data processing system to implement embodiments of the invention. Furthermore, A supplier of the method may upload the article to a network, such as the Internet, and users may download the article via the network to their respective data systems.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive.

What is claimed is:

1. A processor-implemented method for transforming a query in a relational database management system using window aggregation function, the query including an outer block and a subquery, the subquery having an aggregation block that employs an aggregation function with an inner select clause, and the outer block including a reference to an object, the method comprising:
receiving the query;
verifying that the query satisfies a set of preconditions;
replacing the subquery with a select operation that employs window aggregation function;
modifying the outer block to reference the select operation;
adding to the select operation a reference to the object; and
removing the reference to the object from the outer block, in order to avoid redundant execution of common operations for the outer block and the subquery, and to permit optimization of the query.

2. The method of claim 1, wherein the subquery is a correlated subquery; wherein the object comprises a correlated column; wherein the correlated subquery comprises a correlated predicate referencing the correlated column; and wherein the window aggregation function comprises the aggregation function partitioned by the correlated column.

3. The method of claim 2, wherein the correlated predicate is an equality predicate between the object and a second object; and wherein the outer block comprises the equality predicate and the inner select comprises the equality predicate.

4. The method of claim 3, wherein removing the reference to the object comprises removing the equality predicate from the outer block.

5. The method of claim 2, wherein the set of preconditions comprises a condition that the correlated subquery not be a distinct select clause.

6. The method of claim 5, wherein the set of preconditions further comprises a condition that the correlated predicate be an equality predicate between the object and a second object, and a condition that the object be unique.

7. The method of claim 6, wherein the set of preconditions comprises a condition that the inner select not contain a second correlated predicate between the first object and any objects referenced by the inner select other than the second object.

8. The method of claim 2, wherein the set of preconditions comprises a condition that the correlated subquery and the outer block to which it is correlated are not also correlated to another portion of the query.

9. The method of claim 2, wherein verifying that the query satisfies the set of preconditions further comprises performing a transformability test.

10. The method of claim 9, wherein performing a transformability test comprises creating a temporary subquery block based upon the correlated subquery; and further comprises a join operation corresponding to the correlated predicate, for evaluating whether predicates of the temporary subquery block are matched in predicates of the outer block, and removing the temporary subquery block.

11. The method of claim 9, wherein performing a transformability test comprises determining whether the correlated subquery includes predicates referencing the object which are not included in the outer block.

12. The method of claim 1, wherein the selection operation creates a view and wherein the replacing comprises rewriting the inner select clause to materialize the view using the select operation, and removing the aggregation function.

13. The method of claim 1, wherein the select operation creates a view, wherein the outer block comprises a subquery predicate having a reference to the aggregation function, and wherein modifying comprises replacing the reference to the aggregation function in the subquery predicate with a reference to the view.

14. The method of claim 1, wherein verifying that the query satisfies the set of preconditions comprises verifying that the outer block satisfies at least one outer block condition, that the inner select clause satisfies at least one inner select condition, and that the aggregation function satisfies at least one aggregation condition.

15. The method of claim 1, wherein the set of preconditions comprises a condition that the inner select and the outer block contain no functions that are non-deterministic and a condition that the inner select and the outer block contain no functions that have side effects.

16. The method of claim 1, wherein the object comprises a table.

17. The method of claim 1, wherein the object comprises a view.

18. The method of claim 1, wherein the steps of adding the reference and removing the reference comprise rerouting the application of predicates by the outer block through the select operation.

19. The method of claim 1, wherein the subquery is an uncorrelated subquery;
wherein the uncorrelated subquery comprises a reference to the object equivalent to the reference to the object in the outer block;
wherein the window aggregation function comprises the aggregation function partitioned over the object; and
wherein adding the reference comprises adding to the select operation, a reference to the object that is equivalent to the reference to the object in the outer block and in the uncorrelated subquery.

20. The method of claim 19, wherein the uncorrelated subquery comprises an additional predicate referring to the object;
wherein the window aggregation function comprises the aggregation function over an expression; and
wherein the expression applies the additional predicate before computation of the aggregation function.

21. A computer-implemented data processing system for processing a query in a relational database management system using window aggregation function, the query including an outer block and a subquery, the subquery having an aggregation block employing an aggregation function having an inner select clause, and the outer block including a reference to an object, the data processing system comprising:
means for receiving the query;
means for verifying that the query satisfies a set of preconditions;
means for replacing the subquery with a select operation that employs the window aggregation function;
means for modifying the outer block to reference the select operation;
means for adding to the select operation a reference to the object; and
means for removing the reference to the object from the outer block, in order to avoid redundant execution of common operations for the outer block and the subquery, and to permit optimization of the query.

22. The data processing system of claim 21, wherein the subquery is a correlated subquery; wherein the object comprises a correlated column; wherein the correlated subquery comprises a correlated predicate referencing the correlated column; and wherein the window aggregation function comprises the aggregation function partitioned by the correlated column.

23. The data processing system of claim 22, wherein the correlated predicate is an equality predicate between the object and a second object; and wherein the outer block comprises the equality predicate and the inner select comprises the equality predicate.

24. The data processing system of claim 23, wherein the means for removing is removes the equality predicate from the outer block.

25. The data processing system of claim 22, wherein the set of preconditions comprise a condition that the correlated subquery not be a distinct select.

26. The data processing system of claim 25, wherein the set of preconditions further comprises a condition that the correlated predicate be an equality predicate between the object and a second object, and a condition that the object be unique.

27. The data processing system of claim 26, wherein the set of preconditions comprises a condition that the inner select not contain a second correlated predicate between the first object and any objects referenced by the inner select other than the second object.

28. The data processing system of claim 22, wherein the set of preconditions comprises a condition that the correlated subquery and the outer block to which it is correlated are not also correlated to another portion of the query.

29. The data processing system of claim 22, wherein the means for verifying comprises means for performing a transformability test.

30. The data processing system of claim 29, wherein the means for performing the transformability test comprises:
means for creating a temporary subquery block based upon the correlated subquery and comprising a join operation corresponding to the correlated predicate; and
means for evaluating whether the predicates of the temporary subquery block are matched in the predicates of the outer block, and removing the temporary subquery block.

31. The data processing system of claim 29, wherein the means for performing the transformability test comprises means for determining whether the correlated subquery comprises predicates referencing the object which are not comprised in the outer block.

32. The data processing system of claim 21, wherein the selection operation creates a view and wherein the means for replacing comprises:
means for rewriting the inner select clause to materialize the view using the select operation; and
means for removing the aggregation function.

33. The data processing system of claim 21, wherein the select operation creates a view, wherein the outer block comprises a subquery predicate having a reference to the aggregation function; and wherein the means for modifying is adapted to replace the reference to the aggregation function in the subquery predicate with a reference to the view.

34. The data processing system of claim 21, wherein the means for verifying is adapted to verify that the outer block satisfies at least one outer block condition, that the inner select clause satisfies at least one inner select condition, and that the aggregation function satisfies at least one aggregation condition.

35. The data processing system of claim 21, wherein the set of preconditions comprises a condition that the inner select and the outer block contain no functions that are non-deterministic and a condition that the inner select and the outer block contain no functions that have side effects.

36. A computer program product having instruction codes that are stored on a computer-useable medium, for processing a query in a relational database management system using window aggregation function, the query including an outer block and a subquery, the subquery having an aggregation block employing an aggregation function having an inner select clause, and the outer block including a reference to an object, the computer program product comprising:
   a first set of instruction codes for receiving the query;
   a second set of instruction codes for verifying that the query satisfies a set of preconditions;
   a third set of instruction codes for replacing the subquery with a select operation that employs the window aggregation function;
   a fourth set of instruction codes for modifying the outer block to reference the select operation;
   a fifth set of instruction codes for adding to the select operation a reference to the object; and
   a sixth set of instruction codes for removing the reference to the object from the outer block, in order to avoid redundant execution of common operations for the outer block and the subquery, and to permit optimization of the query.

37. The computer program product of claim 36, wherein the subquery is a correlated subquery; wherein the object comprises a correlated column; wherein the correlated subquery comprises a correlated predicate referencing the correlated column; and wherein the window aggregation function comprises the aggregation function partitioned by the correlated column.

38. The computer program product of claim 37, wherein the correlated predicate is an equality predicate between the object and a second object; and wherein the outer block comprises the equality predicate and the inner select comprises the equality predicate.

39. The computer program product of claim 38, wherein the sixth set of instruction codes removes the equality predicate from the outer block.

40. The computer program product of claim 37, wherein the set of preconditions comprise a condition that the correlated subquery not be a distinct select.

41. The computer program product of claim 40, wherein the set of preconditions further comprises a condition that the correlated predicate be an equality predicate between the object and a second object, and a condition that the object be unique.

42. The computer program product of claim 41, wherein the set of preconditions comprises a condition that the inner select not contain a second correlated predicate between the first object and any objects referenced by the inner select other than the second object.

43. The computer program product of claim 37, wherein the set of preconditions comprises a condition that the correlated subquery and the outer block to which it is correlated are not also correlated to another portion of the query.

44. The computer program product of claim 37, wherein the second set of instruction codes performs a transformability test.

45. The computer program product of claim 44, wherein the second set of instruction codes performs the transformability test by:
   creating a temporary subquery block based upon the correlated subquery and comprising a join operation corresponding to the correlated predicate; and
   evaluating whether the predicates of the temporary subquery block are matched in the predicates of the outer block, and removing the temporary subquery block.

* * * * *